United States Patent
Spence et al.

(10) Patent No.: US 6,993,102 B2
(45) Date of Patent: Jan. 31, 2006

(54) SYSTEM AND METHOD FOR CLOCK SYNCHRONIZATION FOR USB SINK DEVICE

(75) Inventors: Steven Donald Spence, Victoria (AU); Nikolai Nikolov, Victoria (AU); Rudolf Ladyzhenski, Victoria (AU)

(73) Assignee: NEC Corporation, Tokyo (JP)

( * ) Notice: Subject to any disclaimer, the term of this patent is extended or adjusted under 35 U.S.C. 154(b) by 738 days.

(21) Appl. No.: 09/908,979

(22) Filed: Jul. 20, 2001

(65) Prior Publication Data

US 2002/0034273 A1    Mar. 21, 2002

(30) Foreign Application Priority Data

Jul. 24, 2000   (AU) .................................... PQ8963

(51) Int. Cl.
*H04L 7/00*    (2006.01)

(52) U.S. Cl. ................. 375/354; 375/222; 375/372; 375/141; 710/52; 710/71; 710/300; 710/57; 713/375; 713/400; 713/502; 709/248; 348/415.1; 370/468

(58) Field of Classification Search ............... 375/222, 375/372, 141, 354; 710/52, 71, 300, 57; 713/375, 400, 502; 709/248; 348/415.1; 370/468

See application file for complete search history.

(56) References Cited

U.S. PATENT DOCUMENTS

| | | | |
|---|---|---|---|
| 4,531,185 A * | 7/1985 | Halpern et al. | 713/375 |
| 4,584,643 A * | 4/1986 | Halpern et al. | 709/248 |
| 5,027,351 A | 6/1991 | DePrycker et al. | |
| 5,134,476 A * | 7/1992 | Aravind et al. | 348/415.1 |
| 5,210,829 A * | 5/1993 | Bitner | 710/57 |
| 5,289,497 A * | 2/1994 | Jacobson et al. | 375/141 |
| 5,297,139 A | 3/1994 | Okura et al. | |
| 5,323,426 A * | 6/1994 | James et al. | 375/372 |
| 5,613,127 A * | 3/1997 | Schultz | 713/502 |
| 5,958,027 A * | 9/1999 | Gulick | 710/300 |
| 6,199,169 B1 * | 3/2001 | Voth | 713/400 |
| 6,256,687 B1 * | 7/2001 | Ellis et al. | 710/71 |
| 6,404,776 B1 * | 6/2002 | Voois et al. | 370/468 |
| 6,625,209 B1 * | 9/2003 | Najafi | 375/222 |
| 6,715,007 B1 * | 3/2004 | Williams et al. | 710/52 |

FOREIGN PATENT DOCUMENTS

| | | |
|---|---|---|
| EP | 0658019 A1 | 6/1995 |
| EP | 0707398 A1 | 4/1996 |
| WO | WO 95/22233 A1 | 8/1995 |

* cited by examiner

*Primary Examiner*—Stephen Chin
*Assistant Examiner*—Sudhanshu C. Pathak
(74) *Attorney, Agent, or Firm*—Foley & Lardner LLP

(57) ABSTRACT

In a method for adaptive synchronization of a data sink device to a data source device coupled by a USB, data is received and stored in a buffer of the sink device at an average data rate representative of the data rate of the source device. A data level for the buffer is determined based on input packet size and output packet size. An accumulated data level for the buffer is compared with a threshold level. A clock frequency for the sink device is corrected when the accumulated data level exceeds the threshold level.

21 Claims, 3 Drawing Sheets

SYSTEM AND METHOD FOR CLOCK SYNCHRONIZATION FOR USB SINK DEVICE

BACKGROUND OF THE INVENTION

1. Field of the Invention

The present invention relates to clock synchronization methods and system for executing such methods. In particular, the present invention relates to a method for using an isochronous or time dependant endpoint to adaptively synchronize the output clock rate of a Universal Serial Bus (USB) data sink to a USB data source input clock rate, without using feed back techniques, feed forward techniques or additional clock signals.

2. Description of the Related Art

In a synchronous communication system having a data source and a data sink, the data output from a data sink is expected to be synchronous with the data input to a data source. When the data source and the data sink are connected using a USB, the data input clock is not synchronous with a USB clock. Therefore, the USB clock does not allow the data output to be synchronized to the data input, even if the data output clock is synchronized to the USB clock. The difference between the input and output clocks leads to a frequency mismatch and subsequent data corruption.

Some systems, which do not require a high degree of data accuracy, can tolerate such frequency mismatch and data corruption. Typical low cost audio applications using a non-synchronized USB audio source (e.g. CD) and USB audio sink (e.g. speakers) are not significantly degraded audibly if audio samples are discarded or inserted to accommodate clock mismatch.

However, for real-time ISDN applications such as video, data loss due to clock frequency mismatch noticeably affects the quality of the service. The mismatch produces effects such as picture freezing and is much less tolerable.

Techniques that can perform clock synchronization between the data input clock and the USB clock have limited application due to the fact that they can only synchronize the USB clock to a limited degree of accuracy. For an application involving a mobile phone using a USB interface to access synchronous services via an ISDN interface, one possible synchronization option is a method referred to as clock mastering for asynchronous source device and synchronous sink device. This method involves the source device influencing a USB host's SOF (Start Of Frame) generation, so that isochronous data transfer is synchronized to the source device. The host SOF rate (1 mS) is adjusted to track the mobile phone's data frame rate (10 mS). An ISDN interface is a USB synchronous sink device, i.e., locked to the SOF clock, and the frame transfer from the mobile phone to the ISDN interface is synchronized. The ISDN clock, i.e., I.430 192 KHz bit clock is synchronized to the SOF clock. The SOF adjustment resolution is $\frac{1}{12000}$-bit times, where a bit period is one 12 MHz clock cycle or 83 ppm (parts per million).

Due to this coarse clock resolution, the source device is not able to select a single optimum SOF period. The source device clock of a mobile phone is locked to the mobile network and is very accurate with the result that the frequency error may approach 83 ppm. As this would still cause frame drift, the source device needs to continuously switch the SOF bit period up and down to achieve a synchronized average SOF period. The sink device must then track the average of the SOF period, as a step of 83 ppm is not acceptable. The I.430 interface imposes a clock accuracy requirement better than ±100 ppm, and clock jitter must be significantly less. To overcome this problem, it is necessary to integrate the frequency change with a period greater than the correction rate, so that the applied sink device frequency correction is much more stable. An error of 83 ppm causes an I.430 frame slip approximately every 3 seconds, so that a correction rate of 3 Hz and an integration period of 3 seconds are a possible solution.

Whilst clock mastering is feasible, it is less than desirable due to the coarse clock adjustment and the limitation that only one device may act as clock master. In a number of applications, this synchronization method cannot be used.

SUMMARY OF THE INVENTION

Therefore, an object of the present invention is to provide a clock synchronizing system and method, which involves an asynchronous source device and adaptive sink device, and allows implicit feed forward clock recovery.

Another object of the present invention is to provide a clock synchronizing system and method that ameliorates or overcomes one or more disadvantages of known synchronization methods and systems.

With this in mind, one aspect of the present invention provides a method for adaptive synchronization of a data sink device to a data source device coupled by a USB, the method is attained by receiving data for a buffer of the sink device at an average data rate representative of the data rate of the source device; by determining a data level for the buffer based on input packet size and output packet size; by comparing an accumulated data level for the buffer with a threshold level; and by correcting a clock frequency for the sink device when the accumulated data level exceeds the threshold level.

Preferably, the correcting step involves correcting the frequency by an amount equal to a constant K divided by the time required for the accumulated data level to drift from a reference level to the threshold level.

The method may further include the step of inhibiting the comparing and correcting step for a predetermined period after the correcting step. The predetermined period may be between three or five times the drift time. Preferably the predetermined period is reduced if the data level traverses the reference level or exceeds twice the threshold level.

The reference level is preferably the data level measured over a first measurement period. The comparing step may be executed periodically.

The threshold level is preferably set to be greater than three times a maximum data level jitter. Preferably the size of the buffer is set to be greater than three times the threshold level.

Another aspect of the present invention provides a system for adaptive synchronization of a data sink device to a data source device. The system includes a source device; and a sink device coupled to the source device by a USB. The sink device includes a circuitry for implementing a buffer for storing received data from the source device and executing the above-described method.

Yet another aspect of the present invention provides a sink device for receiving data from a USB-coupled source device. The sink device includes a circuitry for implementing a buffer for storing received data from the source device and executing the above-described method.

BRIEF DESCRIPTION OF THE DRAWINGS

The present invention will be described with reference to the accompanying drawings, wherein.

DESCRIPTION OF THE PREFERRED EMBODIMENTS

Preferred embodiments of the present invention will be hereinafter described, by way of example only, with reference to the accompanying drawings.

Figure 1:
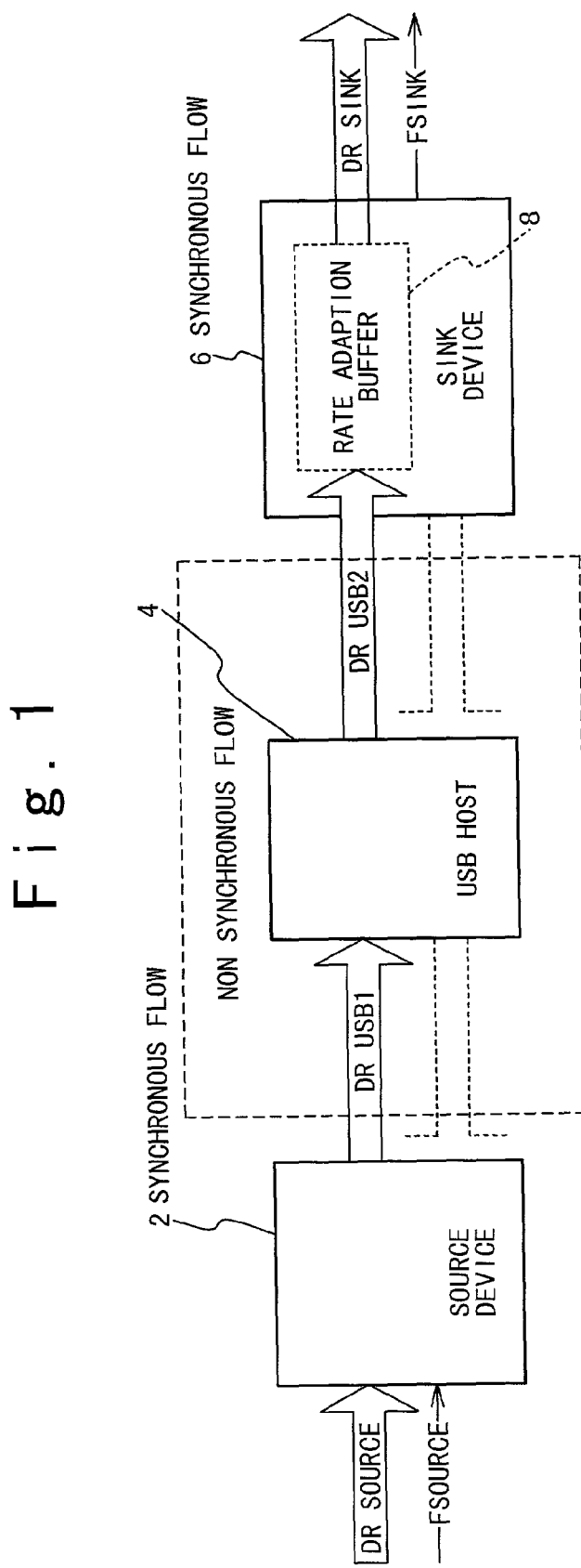
FIG. 1 is a block diagram of an embodiment of a data transfer system executing an adaptive clock synchronization method.

Referring now to FIG. 1, there is generally shown a data transfer system 1, which executes adaptive clock synchronization for data passed from a source device 2 to a sink device 6 using a USB, and a USB host 4 that executes a USB host application. The USB host 4 may be a PC with at least one USB port. The source device 2 may be a mobile telephone, and the sink device 6 may be a computer with a video card or an interface to an ISDN, as described below.

The source device has a synchronous data flow rate referenced DRsource, and a source device frequency referenced Fsource. The source device-to-USB host average data flow rate is referenced DRusb1, and the USB host-to-sink device average data flow rate is referenced DRusb2. The host application preserves the data flow rate from the source device connection to the sink device connection such that DRusb1=DRusb2=DRusb. The sink device data flow rate is denoted as DRsink and the sink device frequency is denoted as Fsink. The sink device 6 includes a rate adaptation buffer 6 which has an input stream received at the rate DRusb2 and an output stream sent at the rate DRsink.

The sink device 6 includes circuit components to implement the buffer 6 and execute the synchronization method. For instance, the components may include a microprocessor and associated control software defining the synchronization method. The techniques used to configure the buffer 6 are known, and would be readily apparent to those skilled in the art.

The adaptive clock synchronization method, as described in detail below, operates by adjusting the sink device data rate DRsink to match the USB data delivery rate DRusb by controlling the sink device clock frequency Fsink. This results in synchronization of the sink device 6 with the source device 2 as the source device data flow rate DRsource is implicit in the USB data delivery rate DRusb when averaged over time.

Figure 3:
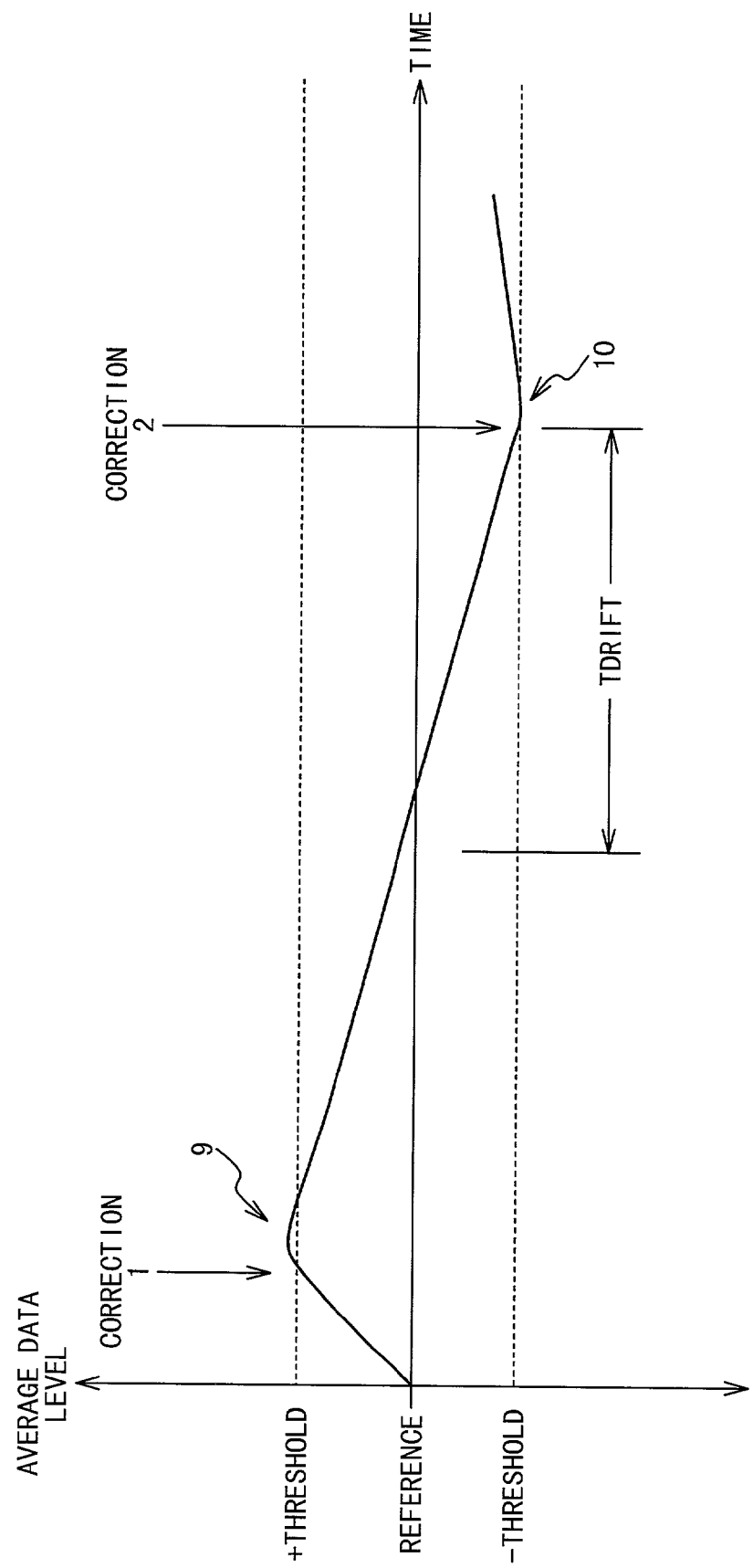
FIG. 3 is a graphical representation of the average sink device data level in the sink device of the system shown in FIG. 1 against time.

The difference between the input and output data streams of the rate adaptation buffer 6 are detected by comparing the sink device data level 12 with two threshold levels, i.e., plus and minus threshold levels. The data level 12 is a difference between the input flow and the output flow. The data level 12 is checked periodically by the sink device 6. As can be seen in FIG. 3, if the threshold is exceeded, a frequency correction is determined based on the inverse of the time (Tdrift) taken for the data level 12 to drift from a reference level to the threshold level. The correction is set approximately 20% greater than necessary to ensure that the drift is reversed and the frequency asymptotes towards the source device frequency. Re-correction is inhibited for a period of 5 times the drift period (Tdrift) or terminated early, if the data level 12 crosses the reference level or 2 times the threshold level. These checks cater for error conditions should they arise. The reference level is determined when data transfer commences.

The flow rate matching process realises a frequency matching (Fsource to Fsink) to better than 100 ppm and typically better than 10 ppm. This meets the requirements of BRI ISDN. Thus, an elimination of data overrun or underrun, which occurs when the source device data rate and the sink device data rate are not matched.

Figure 2:
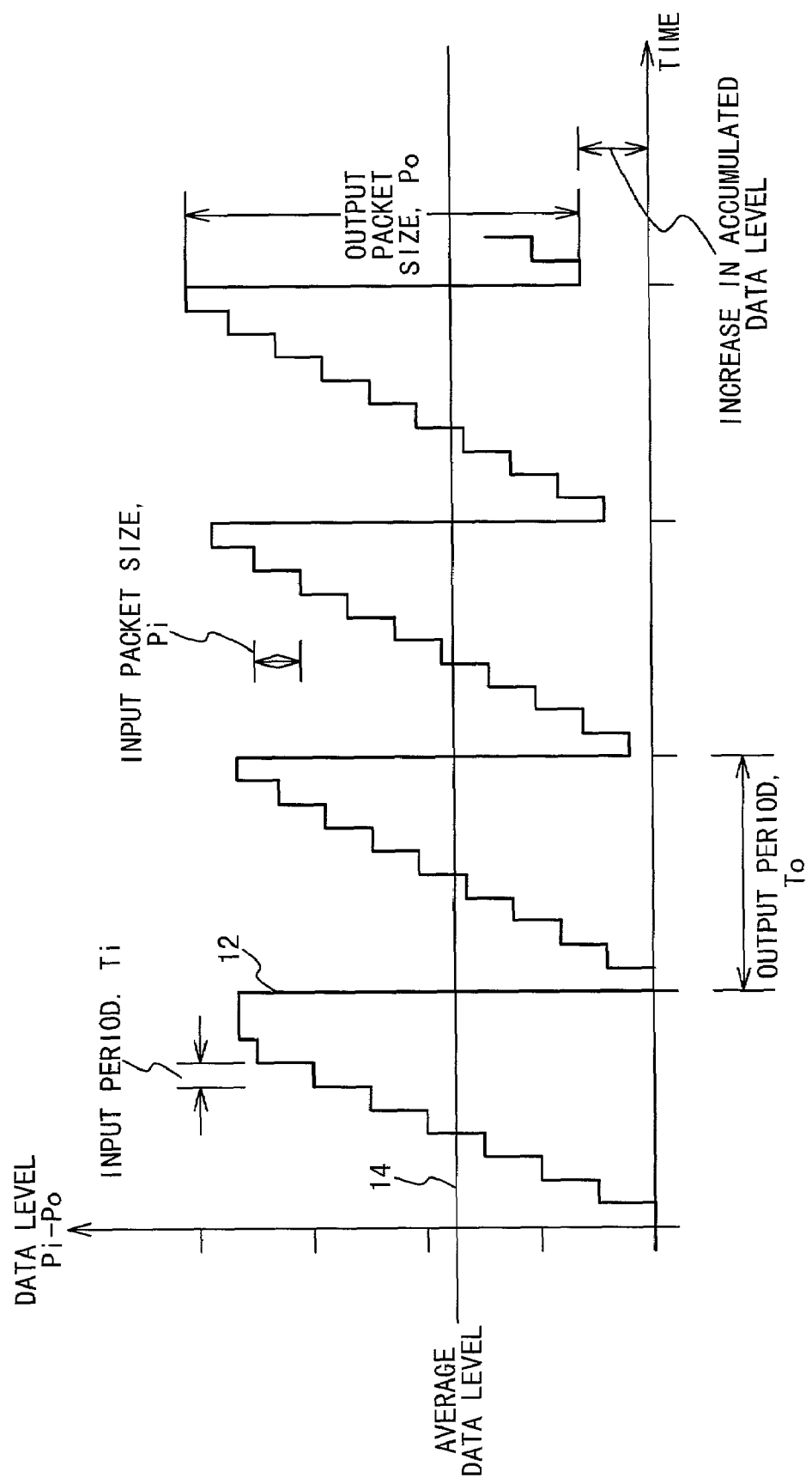
FIG. 2 is a graphical representation of the level of data in a sink device of the system shown in FIG. 1 against time.

FIG. 2 illustrates how the data level 12 of data held in the rate adaptation buffer 6 of the sink device 6 varies over time. In this example, data is shown to arrive in small roughly constant packet sizes (Pi) and is extracted at a fixed rate with a larger packet size (Po). The average data level 14 is an important factor for determining flow imbalance. The increase of the data level 12 is greatly exaggerated for the purposes of this description. For an ISDN interface, a rate difference of 50 ppm will cause the data level 12 to change by 1 byte over about 1 second.

A typical behavior of the average data transfer level 14 is shown in FIG. 3. Two clock correction points 9 and 10 are shown. The rate of drift is slowed at each correction. The overshoot shown at the correction points occurs due to the correction being applied gradually.

To execute the clock synchronization method, the system 1 shown in FIG. 1 includes the following characteristics:

(1) A data source device with a synchronous data flow rate, DRsource.

(2) DRusb=DRsource, when measured over a sufficiently long period, to average out a transport jitter.

(3) All source device data are transferred to the USB host 4. This may involve data repacketization and data packets (Pi) with different size, but constant in time, between the USB frames.

(4) A USB transport rate that is greater than the source device data rate. The source device data delivery rate, DRusb is not the same as the USB transport rate. The rate DRusb is the rate at which the USB system transports data provided by the source device.

(5) A host application which preserves the data flow rate from the source device connection to the sink device connection, such that DRusb1=DRusb2=DRusb, as described above. FIG. 1 shows the source device 2 and sink device 6 both connected to the USB host 4 by a USB. However, in its simplest form, all that are required are the sink device 6 to receive data at a data delivery rate DRusb2 that implies the source device rate DRsource.

The USB system introduces data transfer jitter, i.e., packet size (Pi) variation due to the phase shift between the source device clock, (not shown) and the USB clock (not shown). Consequently, packet size (Po) variation is outputted. The adaptive synchronization method takes this into account, by buffering the data transfer and checking only for long term accumulation or depletion of data, passing through the sink device 6, to determine data rate imbalance.

The variation over time of the data level 12 shown in FIG. 2 is a result of the combined effect of the following factors:

Fsink to Fsource differences at start up, i.e., prior to clock correction;

USB transport jitter; and

Sink frequency jitter arising from the synchronization method.

As long as the rate adaptation buffer 6 is large enough to accommodate the fluctuation, i.e., does not overflow or underflow, the synchronous output data flow from the sink device 6 can be maintained uninterrupted. Balanced data flow requires the quantity of input data minus the quantity of output data to remain constant over time, such that:

if the data level 12 increases then Fsource>Fsink and Fsink must be increased; and if the data level 12 decreases then Fsink>Fsource and Fsink must be decreased.

Data flow balance in the reverse direction occurs simultaneously as a result of synchronization between transmission and reception clocks in both the source device 2 and the sink device 6.

As shown in FIG. 2, the data level 12 changes constantly. In order to determine if there is a flow imbalance and hence a clock frequency difference, it is necessary to determine a trend in the changes of the data level 12. This is carried out by accumulating the data level changes, i.e., the sum of the data input flow minus the data output flow. The data input flow is the total size of the packets received by the buffer 6 and the data output flow is the total size of the packets outputted from the buffer 6.

The Accumulated Data Level (ADL) over a period of time ($\Delta T$) is represented mathematically as:

$$ADL = \text{Reference\_level} + \sum_{0}^{\Delta T} (\text{Data\_input} - \text{Data\_output}) \quad (1)$$

i.e., $$ADL = Reference\_level + \Delta DL$$

where

Reference_level: is the reference (or initial) data level;

Data_input: is the data input flow, being $\Sigma P_i$ wherein $P_i$ is input packet size;

Data_output: is the data output flow, being $\Sigma P_o$, wherein $P_o$ is output packetize; and $\Delta DL$: is the accumulated data level change.

Only changes in the accumulated data level 12 are of interest for clock correction, because the reference data level is constant.

The accumulated data level ($\Delta DL$) varies due to:

(1) The frequency difference between the source device and sink device; and (2) Transport jitter due to the discrete nature of data inflow and outflow.

Thus the change in the Accumulated Data level can also be defined as, $$\Delta DL = \Sigma(\text{Freq\_difference\_level\_drift} + \text{packet\_del/extr\_jitter}) \quad (2)$$

where

Freq_difference_level_drift: is the data level change; and

Packet_del/extr_jitter: is the jitter due to the source device data flow and the sink device data flow.

The second factor, the jitter, causes an error in the measurement of the data level 12 and in the calculation of the frequency correction required to achieve balance. To minimize the jitter influence, the USB data transfer packet size should be kept as small as possible, and the data level measurement should be synchronized to the source device interface or sink device interface which delivers/retrieves data to/from the interface with greater packet size (Pi or Po).

The adaptive clock synchronization method will now be described with reference to the USB sink device 6 being a BRI ISDN adaptor or interface and the USB source device 2 being a mobile phone. The mobile phone receives input data such as a video data in 10 mS frames (80 bytes of data). When the received data is transported over the USB host 4 as source device data, the data frame is spread over nine 1 mS isochronous USB frames (nominally 11 byte frames), not shown, and read by the sink device as 10 mS frames (80 bytes). The data level measurement is synchronized to the data retrieval at the sink device, resulting in a jitter of 11 bytes (a USB source device packet). If the data level measurement is not synchronized, the potential jitter is 91 bytes (a USB source device packet+a sink device packet), which is highly unacceptable.

The first factor causing variations in the accumulated data level ($\Delta DL$) is due to the source device—sink device frequency difference as mentioned earlier. The relationship of the Freq_difference_level_drift (data level change) to the frequency difference is derived as follows:

$$\Delta DL \propto F\text{source} - F\text{sink} \quad (3)$$

$$\Delta DL = K \times \int_0^{\Delta T} (F\text{source} - F\text{sink}) dt$$

$$\Delta DL = K \times \Delta T \times (F\text{source} - F\text{sink})$$

where $\Delta T$: is the measurement period, and

K: is a system design constant.

A frequency correction value (Fcorr) is equal to the frequency difference between the source device frequency and the sink device frequency (Fsource−Fsink), and is determined by rearranging Equation (3), by setting the data level 12 to a suitable error detection threshold and by setting $\Delta T$ to the time for the data level 12 to drift from the reference level to the positive or negative threshold level, as shown in FIG. 3, such as:

$$F\text{corr} = \text{Threshold\_level}/(K \times T\text{drift}) \quad (4)$$

The frequency correction value is therefore determined by measuring the time taken for the data level to shift from the reference level to a threshold level. The key factor in doing this is to accurately determine the data level and its change. As an example, the method and an appropriate set of parameters for a given USB stream and an ISDN interface are described below.

The threshold level is the level which represents a significant/detectable change of the average buffer level. This level should preferably be:

(1) as low as possible to minimise the rate adaptation buffer size; and (2) as high as possible to reduce the impact of jitter error on frequency correction accuracy.

Jitter may cause the threshold level to be exceeded earlier and the frequency correction value to be incorrectly calculated. A small Tdrift measure produces an overcorrection, as the correction factor is inversely proportional, as shown in Equation (4). This is acceptable as long as the flow drift is reversed and the magnitude of the frequency error reduced, so that successive corrections asymptote the error to zero. The level of overcorrection only impacts on the rate of convergence of the frequency error and does not affect data transfer quality. Hence, a maximum overcorrection due to jitter of 50% is recommended. This is comfortably below the 100% limit over which the sink device frequency will diverge from the source device frequency.

The threshold level is determined and set so that jitter does not cause an over-correction greater than 50%. The threshold level is determined from Equation (4) as follows:
Fcorr=Threshold_level/(K×Tdrift) without jitter
Fcorr_j=Threshold_level/(K×Tdrift_j) with jitter For a 50% overcorrection, i.e. Fcorr_j/Fcorr=1.5

Then Tdrift/Tdrift_j=1.5 or Tdrift_j=⅔ Tdrift

This occurs when the jitter level is 30% of the threshold level. Hence, the threshold level must be at least 3 times the jitter level.

The data level is periodically compared with the threshold level at each monitoring period to minimize processing requirements.

In the case of the ISDN example, the USB packet size is nominally 11 bytes, the maximum jitter error is 11 bytes, the threshold level=3×11=33 bytes, and the monitoring period=1 second.

The data level change due to a maximum frequency error of 100 ppm over 1 second=1.25 bytes based on Equation (5). The correction response is not effected by a one second monitoring period.

Clock correction is undertaken when the accumulated data level change (ΔDL) becomes equal or exceeds the threshold level in absolute terms. A frequency correction value Fcorr is determined, the sink device clock Fsink is adjusted by Fcorr and further correction is inhibited for a period to allow the data level to asymptote back towards the reference level.

The correction value Fcorr is increased by 20% over that which is derived from Equation (4) to accommodate calculation error and ensure that the flow imbalance is reversed. The over-correction factor is implementation dependent. It must exceed any calculation error resulting from the implementation but should not exceed 100% minus the overcorrection which results due to data level jitter. The synchronization method asymptotes the sink device frequency Fsink to a value, which slowly hunts between a slightly high frequency and slightly low frequency about the actual source device frequency Fsource. This is also carried out to accommodate the limitations in clock setting resolution. The method operates through the use of the ± threshold levels and a minimum correction value. For the ISDN example, the minimum adjustment is ±1 ppm. The maximum correction is also limited to ±100 ppm to comply with I.430 requirements.

The sink device clock frequency adjustment rate is limited to provide an acceptable output clock jitter. In the ISDN case example, the adjustment rate is restricted to 1 ppm per 10 mS.

The correction inhibit period is employed to give time for the correction to take effect. This correction inhibit period is required because of the following:
(a) jitter will cause the data level value to recross the threshold until the average data level falls below the threshold minus the maximum jitter;
(b) the limited clock adjustment rate may cause the data level to increase further before the full correction takes place; and
(c) the flow imbalance, though reversed by the correction, is reduced in magnitude and may require considerable time for the data level to reduce from the threshold level to the reference level.

The inhibit period is set to between 3× and 5× Tdrift and terminated immediately if the reference level or twice the threshold level is crossed. The factor of 5 results from the frequency correction being nominally overcorrected by 20%. Thus, the time for the data level to reduce back to the reference level is Tdrift/0.2. The factor may be as low as 3×, as this will still ensure that the data level has decreased to a level less than ½ the threshold and jitter will not cause false re-correction. The termination conditions are included to accommodate the additional overcorrection due to jitter and further change of the source device frequency Fsource device.

The system design constant K in Equation (3) is determined by setting ΔT, (Fsource−Fsink) and ΔDL to known values for the application. For example, a 64 Kbps data stream, 1 byte of data is transmitted every 125 μS. If the frequency error (Fsource−Fsink) is 1 ppm, the data level will increase by 1 byte in 125 μS/10⁻⁶=125 seconds. So, by setting ΔT=125 in Equation 3 then, $K=\Delta DL/(\Delta T \times (F\text{source}-F\sin k))=1/(125\times 1)=1/(125 \text{ s}^{-1}\text{ppm}^{-1})$ Substituting for K, equation (4) becomes:

$$F\text{corr}=125\times \text{Threshold}/T\text{drift} \text{ ppm} \quad (5)$$

where Tdrift has units of seconds.

For the ISDN example, the sink device clock is implemented as a Voltage Controlled Oscillator (VCO) controlled by a Digital to Analogue Converter (DAC) output from a microprocessor that monitors the rate adaptation buffer and executes the synchronization method of the present invention to determine Fcorr. The VCO has a ±2V input range to adjust the frequency ±100 ppm. So, for a 5V DAC range, 1 bit adjusts the frequency 0.98 ppm. Including the 20% overcorrection, the constant K becomes 153.6 (=125×1.2/0.98) and the DAC output correction value (DACout)

$$DAC\text{out}=153.6\times \text{Threshold}/T\text{drift} \quad \text{bits/ppm}$$

Many modifications will be apparent to those skilled in the art without departing from the scope of the present invention as hereinbefore described with reference to the accompanying drawings.

What is claimed is:

1. A method of adaptive synchronization of a data sink device to a data source device coupled by a USB, comprising the steps of:
receiving data at a buffer of said sink device at an average data rate representative of a data rate of said source device;
determining a data level for said buffer based on input packet size and output packet size;
comparing an accumulated data level for said buffer with a threshold level;
correcting a clock frequency for said sink device when said accumulated data level exceeds said threshold level, said correcting step correcting the clock frequency by an amount equal to a constant K divided by a drift time required for the accumulated data level to drift from a reference level to the threshold level; and
inhibiting a next execution of said comparing step and said correcting step for a predetermined period after said correcting step.

2. The method according to claim 1, wherein the predetermined period is between three or five times said drift time.

3. The method according to claim 1, wherein said predetermined period is reduced if said data level traverses said reference level or exceeds twice the threshold level.

4. The method according to claim 1, wherein the reference level is the data level measured over a first measurement period.

5. The method according to claim 1, wherein said comparing step is executed periodically.

6. The method according to claim 1, wherein the threshold level is set to be greater than three times a maximum data level jitter.

7. The method according to claim 1, wherein a size of the buffer is set to be greater than three times said threshold level.

8. A system for adaptive synchronization of a data sink device to a data source device, comprising:
 a source device; and
 a sink device coupled to said source device by a USB, and comprising a buffer, and
 wherein said sink device stores data in said buffer at an average data rate representative of a data rate of said source device;
 determines a data level for said buffer based on input packet size and output packet size;
 compares an accumulated data level for said buffer with a threshold level; and
 corrects a clock frequency for said sink device when said accumulated data level exceeds said threshold level by correcting the clock frequency by an amount equal to a constant K divided by a drift time required for the accumulated data level to drift from a reference level to the threshold level; and
 wherein said sink device inhibits a next execution of said comparing operation and said correcting operation for a predetermined period after said correcting operation.

9. The system according to claim 8, wherein the predetermined period is between three or five times said drift time.

10. The system according to claim 8, wherein said predetermined period is reduced if said data level traverses said reference level or exceeds twice the threshold level.

11. The system according to claim 8, wherein the reference level is the data level measured over a first measurement period.

12. The system according to claim 8, wherein said comparing operation is executed periodically.

13. The method according to claim 8, wherein the threshold level is set to be greater than three times a maximum data level jitter.

14. The method according to claim 8, wherein a size of the buffer is set to be greater than three times said threshold level.

15. A sink device for receiving data from a USB-coupled source device, comprising:
 a buffer;
 receiving means for receiving data at said buffer of said sink device at an average data rate representative of a data rate of said source device;
 determining means for determining a data level for said buffer based on input packet size and output packet size;
 comparing means for comparing an accumulated data level for said buffer with a threshold level;
 correcting means for correcting a clock frequency for said sink device when said accumulated data level exceeds said threshold level, wherein said correcting means corrects the clock frequency by an amount equal to a constant K divided by a drift time required for the accumulated data level to drift from a reference level to the threshold level; and
 inhibiting means for inhibiting next execution of said comparing step and said correcting step for a predetermined period after said correcting step.

16. The sink device according to claim 15, wherein the predetermined period is between three or five times said drift time.

17. The sink device according to claim 15, wherein said predetermined period is reduced if said data level traverses said reference level or exceeds twice the threshold level.

18. The sink device according to claim 15, wherein the reference level is the data level measured over a first measurement period.

19. The sink device according to claim 15, wherein said comparing means is executed periodically.

20. The sink device according to claim 15, wherein the threshold level is set to be greater than three times a maximum data level jitter.

21. The sink device according to claim 15, wherein a size of the buffer is set to be greater than three times said threshold level.

* * * * *